United States Patent [19]
O'Brien et al.

[11] Patent Number: 5,194,150
[45] Date of Patent: Mar. 16, 1993

[54] THREE CHAMBER VESSEL FOR HYDROCYCLONE SEPARATOR

[75] Inventors: Kevin J. O'Brien, Houston, Tex.; Pete A. Thompson, Gloucester, England; Stephen T. McCoy, Missouri City, Tex.

[73] Assignee: Conoco Specialty Products Inc., Houston, Tex.

[21] Appl. No.: 739,282

[22] Filed: Aug. 1, 1991

[51] Int. Cl.⁵ .................................... B01D 21/26
[52] U.S. Cl. ........................ 210/233; 210/232; 210/512.1; 209/144; 209/211; 55/459.1
[58] Field of Search .............. 210/512.1, 512.2, 233, 210/232; 209/144, 211; 55/459.1

[56] References Cited

U.S. PATENT DOCUMENTS

| | | |
|---|---|---|
| 2,622,735 | 12/1952 | Criner . |
| 3,371,794 | 3/1968 | Johnson . |
| 3,543,931 | 12/1970 | Rastatter . |
| 4,208,270 | 6/1980 | Grieve et al. . |
| 4,585,466 | 4/1986 | Syred et al. . |
| 4,650,584 | 3/1987 | Macierewicz ............... 209/144 |
| 4,673,495 | 6/1987 | Carroll et al. ............... 209/211 |
| 5,009,785 | 4/1991 | Webb . |

FOREIGN PATENT DOCUMENTS

WO89/02312 3/1989 PCT Int'l Appl. .
WO89/11339 11/1989 PCT Int'l Appl. .

*Primary Examiner*—Robert A. Dawson
*Assistant Examiner*—David Reifsnyder
*Attorney, Agent, or Firm*—David W. Westphal

[57] ABSTRACT

The invention provides a highly space efficient solution to designing hydrocyclone vessels and the liners that are used therein. Moreover, the invention reduces the maintenance requirements for the vessels by providing the liners as units which are preassembled outside the vessel and installed in and out of the vessel without bolts or other minimally detailed process. The invention primarily includes a three chamber vessel wherein the inlet chamber is between the outlet and reject chambers. Therefore the inlet to the liners is between the plates dividing the chamber into separate chambers and the outlets from the liners extend straight into the end chambers. This avoids having to provide conduits from the reject end of the liner to a reject gallery in the plate or outside the vessel. Secondly, the design incorporated a no bolt design to secure the involute inlet into the liner and secure the liner into the opening in the plate. The reject plug at the reject end of the liner includes a shoulder portion which is particularly designed to stop the rotation of the liner by contacting the wall of the vessel and by contacting one another.

19 Claims, 7 Drawing Sheets

PRIOR ART

THREE CHAMBER VESSEL FOR HYDROCYCLONE SEPARATOR

FIELD OF THE INVENTION

This invention relates to hydrocyclones for separating a fluid mixture into separate liquid constituents by density, and more particularly to the design, manufacture and assembly of the hydrocyclone vessel and the liners within the vessel.

BACKGROUND OF THE INVENTION

Hydrocyclones have been used for a number of years in offshore petroleum platforms for separating oil and other residue from water so that the water is clean and environmentally suitable for discharging into the sea and the oil may be directed to a suitable transport for shipping to a refinery. Such hydrocyclones are used for separating fluid mixtures having a wide range of oil/water proportions. Some hydrocyclones are designed to separate oil from water, others are designed to separate water from oil, and there are still others that are designed to separate mixtures of generally equal proportions. The latter hydrocyclones are sometimes referred to as pre-separation hydrocyclones since the outlet streams are often directed to dewatering and de-oiling hydrocyclones as is known. With the space limitations and weight carrying capacity of an offshore platform, weight and size of most equipment is carefully scrutinized. Accordingly, there has been a lot of developmental work on improving the efficiency of the hydrocyclone operation so that the oil outlet stream includes minimal water content and the water outlet stream includes minimal oil content. As the hydrocyclones have further developed in both complexity and capacity, the vessels in which they operate have become bigger to handle the equipment and additional liners used to separate the liquid constituents.

Figure 1:
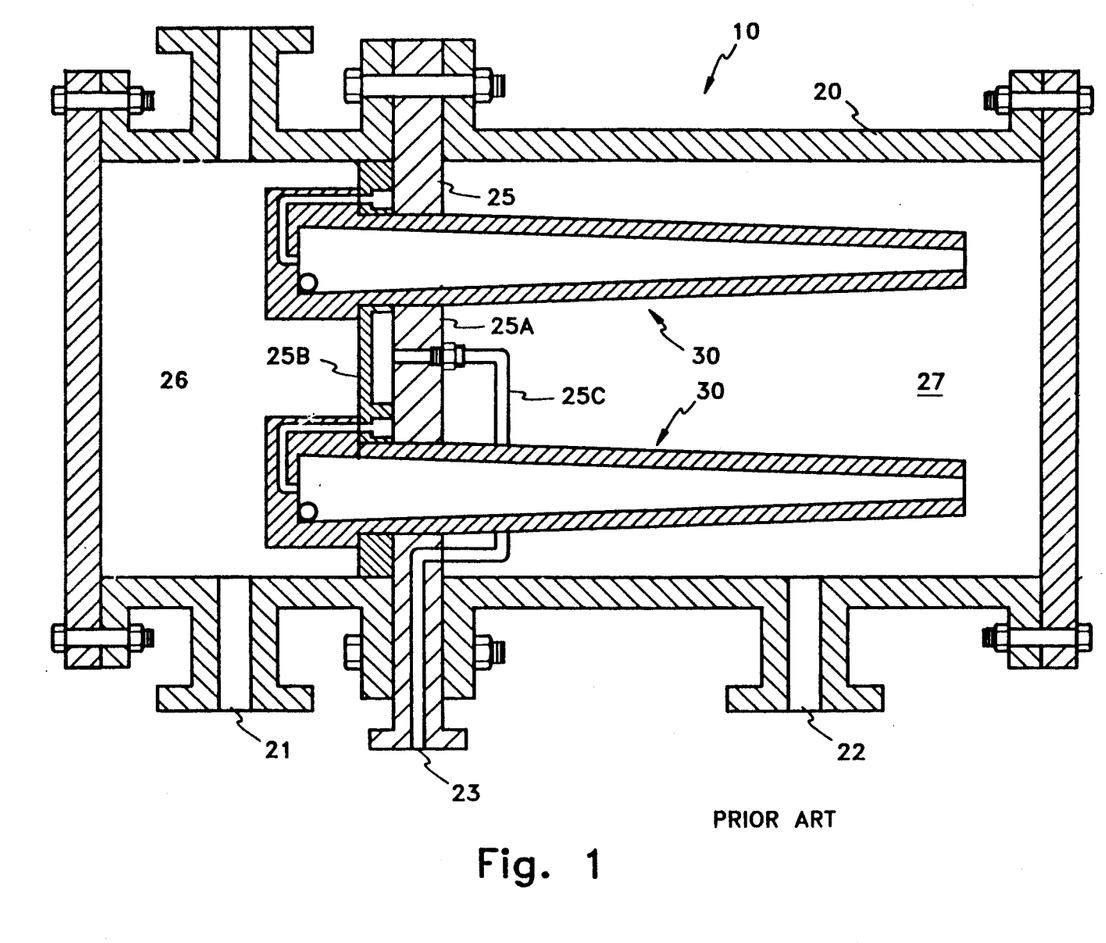
FIG. 1 is a cross sectional view of a prior art hydrocyclone vessel with the liners therein.
Figure 2:
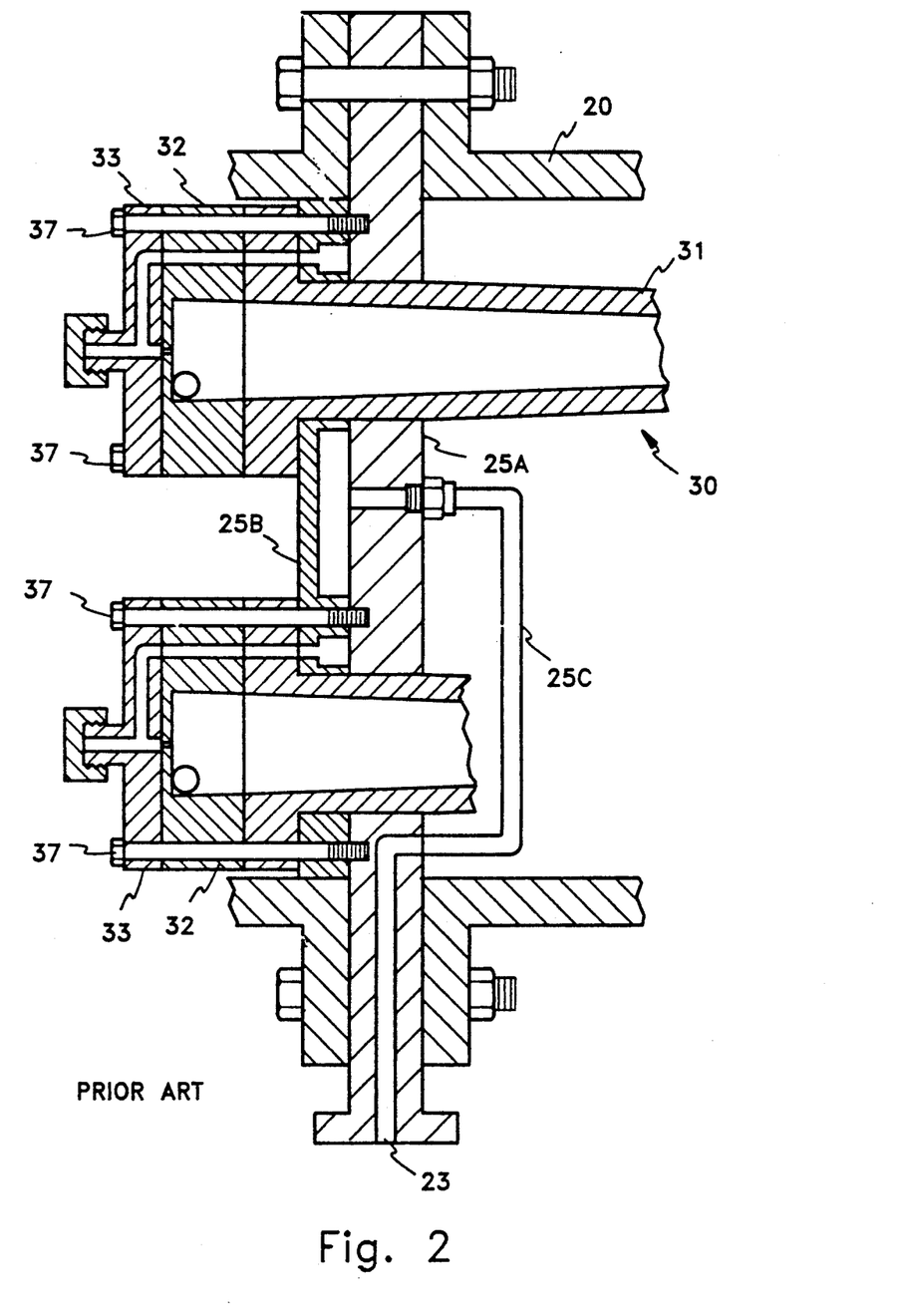
FIG. 2 is an enlarged cross sectional fragmentary view of the head portions of the hydrocyclone liners illustrated in FIG. 1.

Referring to FIG. 1, there is shown a simplified prior art design of a hydrocyclone generally indicated by the number 10. The prior art design includes a vessel 20 having a liquid mixture inlet port 21 generally at one end and a water outlet port 22 generally at the other end. Within the vessel 20, there is a mounting plate 25 having a plurality of openings through each of which a liner 30 may be inserted and mounted. The plate 25 divides the vessel into an inlet chamber 26 and a water outlet chamber 27. As may be more clearly understood from FIG. 2, the plate 25 is comprised of two plate halves 25A and 25B which define a plenum for the receipt and collection of oily water. The oily water is discharged from the vessel through a conduit 25C which leads to a oil outlet port 23 at the side of the vessel 20. As can be more clearly seen in FIG. 2, the liner 30 comprises a number of elements that are assembled at the vessel 20. The liner 30 comprises an elongate tube 31 having a reducing inner diameter, an involute inlet head 32 connected to the larger diameter end of the elongate tube 31 for admitting the liquid mixture into the liner 30 and directing it into a swirling motion, and an overflow gallery 33 for collecting the overflow fluid exiting through the axial port in the involute inlet head and directing the overflow fluid though the passage indicated at 35 to the interconnected plenums in the plate 25. The elements 31, 32 and 33 are stacked and held together by bolts 37 which are attached to the plate 25 by screw threads. To assemble a number of liners 30 in a vessel requires significant manual labor holding each of the elements in position to insert a bolt down through the stack, threading and tightening the bolts. In the adverse conditions of an offshore platform, maintaining the vessel may be quite difficult and time consuming as well as a safety hazard for maintenance personnel.

Additionally, the combination of the bolts and the overflow gallery add significantly to the dimension of the liners. As noted above, platform space is critical and any waste of space will not be tolerated. The capacity of the hydrocyclone apparatus is determined by the size and number of the liners. With the space taken by the return line in the overflow gallery, and the space used by bolts prevents using any additional interior vessel space for adding to the capacity of the vessel 20.

Accordingly, it is an object of the present invention to provide a hydrocyclone apparatus which overcomes the drawbacks and disadvantages of the prior art as discussed above.

It is a more particular object of the present invention to provide a hydrocyclone apparatus which has greater fluid separation efficiency in the smallest possible package.

It is a further object of the present invention to provide a hydrocyclone apparatus which is less complex than prior art hydrocyclone devices and is more easily serviced by maintenance personnel.

SUMMARY OF THE INVENTION

The above and other objects of the invention are achieved by the provision of a hydrocyclone apparatus comprised of a generally cylindrical hollow pressure vessel having two spaced apart dividing plates disposed generally transversely within the vessel to divide the vessel into a medial inlet chamber and two end discharge chambers. At least one longitudinally extensive hollow liner is disposed through openings in each of the dividing plates wherein the liners each have a fluid inlet along a peripheral portion thereof spaced inwardly from the ends thereof and outlets adjacent its opposite ends. Seals are provided for sealing the portion of the openings around the periphery of the liner in each of the dividing plates so that the chambers are sealingly isolated from one another except through the liner.

The invention is also directed to a hydrocyclone apparatus comprised of a generally cylindrical hollow pressure vessel having a first open end, a second opposite closed end, and an end cap for closing the first open end. At least one dividing plate is spaced inwardly from the first open end of the vessel between the first open end and the second end wherein the dividing plate is disposed generally transversely within the vessel to define separate chambers therein. A plurality of longitudinally extensive hollow liners each having a header end, an opposite tail end, a fluid inlet along a peripheral portion thereof spaced inwardly from the ends thereof, an underflow outlet adjacent the tail end and an overflow outlet adjacent the header end are disposed through openings in the dividing plate so that the tail end of each the liner is within one chamber and the underflow outlet is within another chamber. Seals are provided for sealing the portion of each opening around the periphery of each liner in the dividing plate so that the chambers are sealingly isolated from one another except through the liner. An engagement device is provided on the header end of each of the liners to engage one another to prevent rotation of the liners which would otherwise be rotatable within the openings.

The invention is further directed to a hydrocyclone apparatus which is comprised of an elongate tube having a peripheral wall enclosing a hollow interior, a first header end, an opposite open tail end for discharging the heavier density liquid, and a breech opening in the peripheral wall. An inlet block is provided for being received into the hollow interior of the tube through the breech opening. The inlet block includes a generally tangentially oriented inlet for swirling the fluid mixture as it is admitted into the hollow interior of the elongate tube.

The invention is also directed to a hydrocyclone apparatus which is comprised of a relatively elongate tube having a peripheral wall enclosing a hollow interior, a first open header end, an opposite open tail end for discharging the heavier density liquid, and a breech opening in the peripheral wall. An inlet block is provided for being received into the hollow interior through the breech opening. The inlet block includes a generally tangentially oriented inlet for swirling the fluid mixture as it is admitted into the hollow interior of the elongate tube. An overflow plug is provided for being received into the header end of the elongate tube to engage the inlet block and restrain the inlet block from exiting the hollow interior through the breech opening. The overflow plug is secured by screw threads in the open header end of the tube and the screw threads are oriented relative to the generally tangentially oriented inlet of the inlet block such that the drag of the fluid mixture passing through the tangential inlet causes the elongate tube to rotate in a direction which tightens the screw threads between the elongate tube and the overflow plug.

The above and other objects of the invention are accomplished by a method of assembling a hydrocyclone separator system which comprises slidably inserting the separator tubes through the open end of the pressure vessel into the hollow interior thereof through an opening in the dividing plates until the shoulder portion engages the dividing plate to limit the longitudinal movement of the tubes in a first longitudinal direction. The tubes are further inserted into the pressure vessel until all of the openings are filled with tubes. An end plate is affixed to the open end of the pressure vessel to enclose the open end of the pressure vessel and also to limit the movement of the tubes in the opposite longitudinal direction and thereby hold the tubes in assembly within the pressure vessel.

BRIEF DESCRIPTION OF THE DRAWINGS

Some of the objects of the invention have been stated and others will become apparent as the description proceeds as taken in connection with the accompanying drawings in which.

DETAILED DESCRIPTION OF THE PREFERRED EMBODIMENT

As will be discussed throughout the following pages, the illustrated embodiment of the hydrocyclone apparatus is directed to de-oiling a fluid mixture containing primarily water with a small portion of oil therein. The invention, however, is not limited to de-oiling water, but rather has applications for dewatering oil/water mixtures and separating fluid mixtures not including oil or water or both. As it has now been clearly stated that the invention has broader application than the illustrated apparatus, the description of the preferred embodiment will proceed recognizing that such broader applications may require modifications of the preferred embodiment in a manner that are within the skill of a person having ordinary skill in the art.

Figure 3:
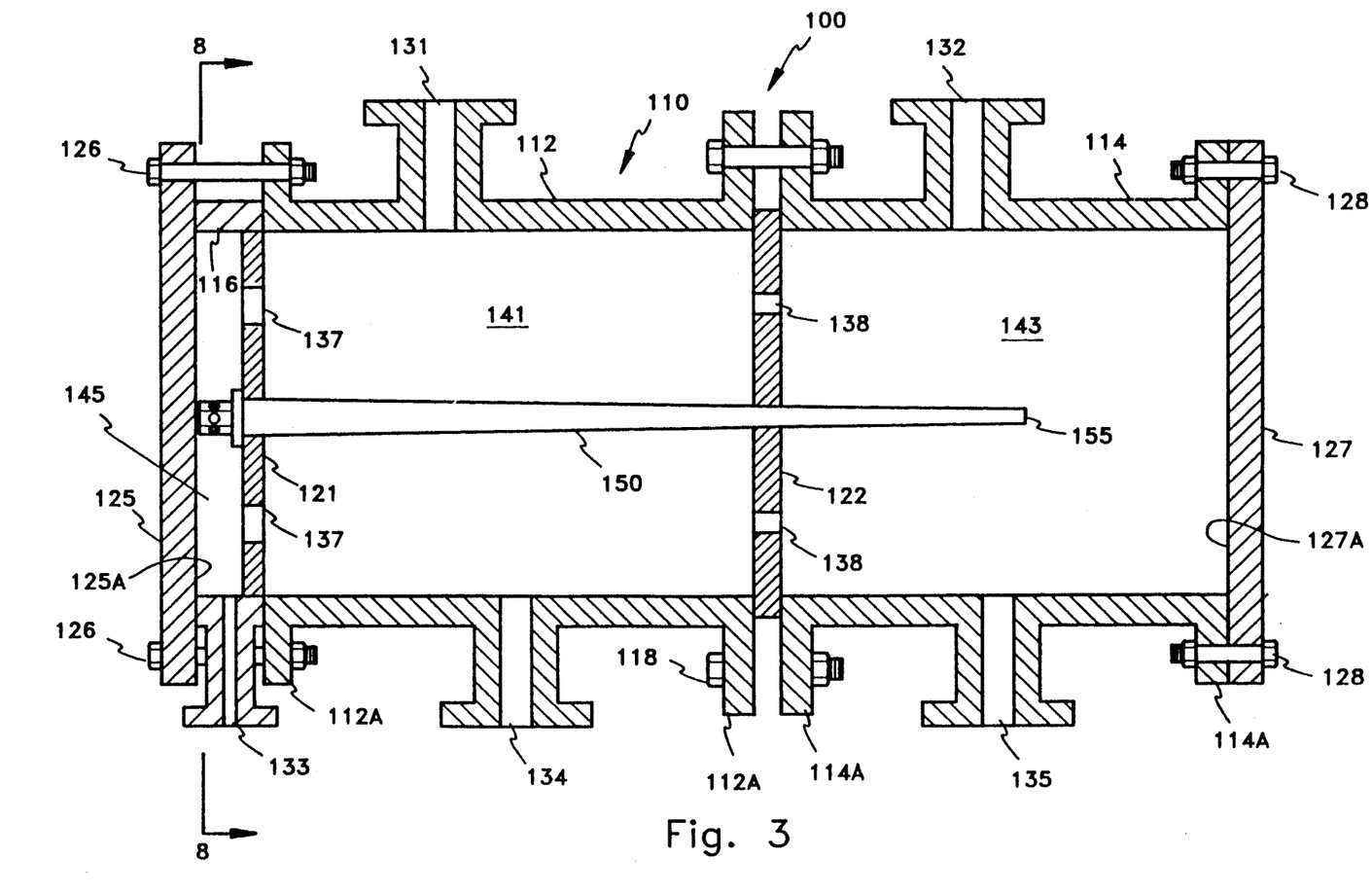
FIG. 3 is a cross sectional view of a hydrocyclone apparatus similar to FIG. 1 embodying the features of the instant invention.

Referring now more particularly to FIG. 3, a preferred embodiment of a hydrocyclone apparatus is generally indicated by the number 100 which includes the features of the present invention. The hydrocyclone apparatus 100 comprises a generally cylindrical hollow pressure vessel 110 which is preferably an assembly of elements and components. The central components are a pair of open ended hollow first and second sleeve sections 112 and 114, sometimes referred to as spool sections, having flange portions 112A and 114A extending radially outwardly at the ends thereof. The first and second sleeve sections 112 and 114 are attached together by bolts 118. A third open ended hollow sleeve section 116 is attached to the free end of the first hollow sleeve section 112 by bolts (not shown). As illustrated, the third sleeve section 116 has a shorter length dimension than the first and second sections 112 and 114 which is suitable for the small volumes of oil discharged in a de-oiling system. However, in a dewatering, dehydration or pre-separation hydrocyclone, the third section may have to be larger to accommodate the larger volumes of oil as will be described in more detail below. The open end 125A of the vessel 110 at the left side of the drawing is closed by an end cap 125 which is secured by bolts 126 and the opposite open end 127A is closed by a second end cap 127 which is secured by bolts 128. Alternatively, the second section 114 may be manufactured with a closed end avoiding the need for a second end cap 127. The aforementioned sections 112, 114, and 116 and end caps 125 and 127 form a generally closed pressure tight vessel 110 which is able to withstand significantly high pressure. Accordingly, suitable seals and gaskets (not shown) are provided between the various connected parts. Moreover, the sections 112, 114, 116 and end caps 125, and 127 are made of high strength material such as steel and provided with a substantial thickness dimension to withstand the high pressure to which the vessel will be subjected.

Within the generally closed vessel 110 are positioned two dividing plates to divide the space into three chambers. A first dividing plate 121 is positioned generally at the juncture of the first hollow section 112 and the third section 116. The second dividing plate 122 is generally positioned at the juncture of the first and second sections 112 and 114. Each of the dividing plates is therefore spaced inwardly from the ends of the vessel and oriented generally transversely across the generally cylindrical space within the vessel 110. The three chambers in the vessel 110 defined by the dividing plates 121 and 122 are a medially positioned inlet chamber 141 between the two dividing plates 121 and 122, a first end underflow discharge chamber 143, and a second end overflow discharge chamber 145. It should be noted that at least the first dividing plate 121 does not have the same thickness dimension as the sections 112, 114 and 116 and the end caps 125 and 127. As will be discussed below, the first dividing plate 121 receives support from the first end cap 125.

The vessel 110 further includes a number of ports for fluid to enter and exit the vessel. In particular, the vessel includes a first inlet port 131 in the side wall of section 112 for a fluid mixture to enter the vessel 110. The fluid is separated, as will be discussed below, into separate liquid constituents. In a de-oiling hydrocyclone such as in the illustrated embodiment, a fluid mixture of oil and water is be separated into a heavier phase underflow of substantially oil-free clean water and a lighter phase overflow fluid being a mixture of oil and water wherein the oil comprises a substantial portion of the mixture. The clean water exits through the discharge port 132 and the overflow fluid is discharged through overflow port 133. The remaining ports 134 and 135 are drainage ports which may be provided with valves which are opened to drain the vessel for maintenance. The ports 131, 132, and 133 are also provided with suitable valves as necessary to control the operation of the hydrocyclone apparatus 100.

The dividing plates 121 and 127 include a plurality of openings 137 and 138, respectively, for mounting liners 150 to extend longitudinally in the vessel 110. As illustrated, the openings 137 are larger than the openings 138. This is due in part to the tapered or reducing diameter of the liners 150 and also to make it easier to install and remove the liners 150 from the vessel 110. The liners 150 are installed and removed, as will be further described below, through the open end 125A of the vessel 110 with the end cap 125 removed. The openings 137 and 138 are generally axially aligned so that when the liners 150 are provided therein, they are generally parallel to the vessel 110. Although the embodiment is illustrated in FIG. 3 with only one liner 150 and a number of unfilled openings 137 and 138, this is for clarity and illustration purposes only. Actually, all of the openings 137 and 138 would be filled with a liner 150 or filled with a "blank" or nonfunctional liner or plugged by other means. Moreover, the liners 150 are packed as tightly into the vessel as possible and practical. The denser the packing, the greater the capacity of the hydrocyclone apparatus 100.

Figure 4:
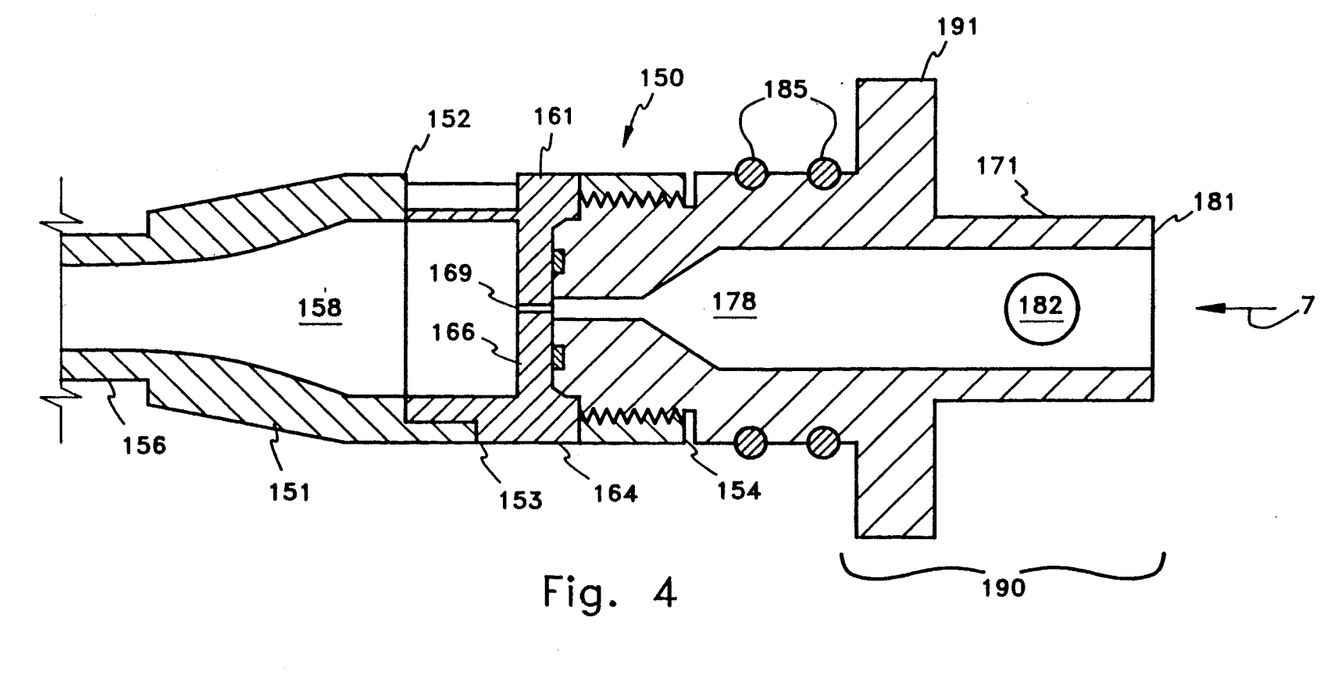
FIG. 4 is an enlarged fragmentary cross sectional view of the head portion of the liner illustrated in FIG. 3.
Figure 5:
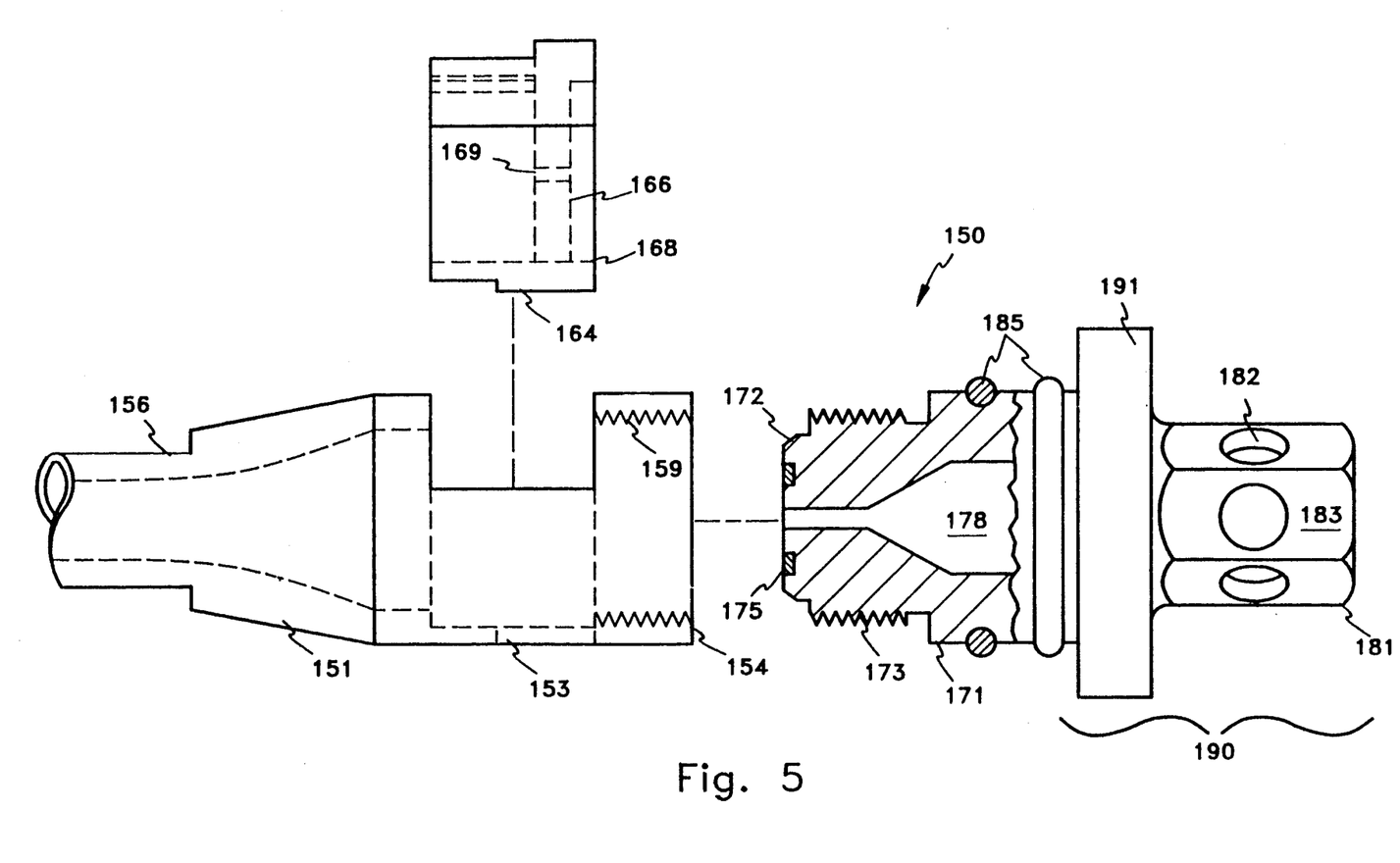
FIG. 5 is an exploded view of the liner illustrating the assembly thereof.
Figures 6, 7:
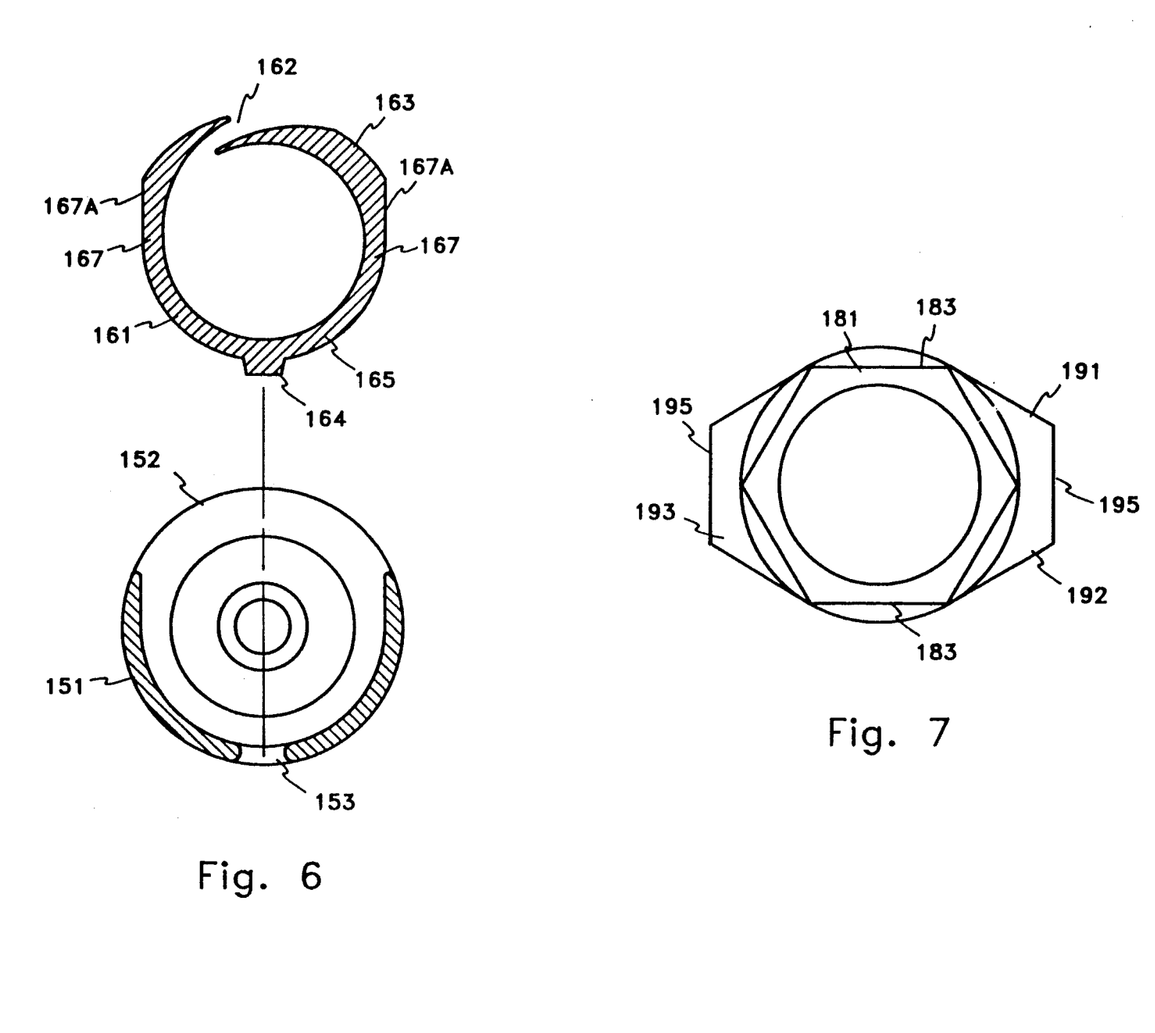
FIG. 6 is a cross sectional exploded view of the liner taken along line 6—6 of FIG. 5.
FIG. 7 is an end view taken from the viewpoint of arrow 7 in FIG. 4 of the end plug illustrating the shape of the antirotation shoulder.

The liners 150 are more particularly illustrated in FIGS. 4-7 and referring now to FIGS. 4, 5 and 6, the liner 150 may be seen to be an assembly. The liner 150 comprises an elongate tube 151 having opposite open ends 154 and 155 (FIG. 3) and made of stainless steel, plastic or other suitable material. The first open end 154 is sometimes referred to as the header end and is somewhat larger in diameter than the opposite open end 155 which is referred to as the tail end. The tube 151 has a peripheral wall defining a hollow interior space 158 having a predetermined interior contour which reduces in diameter from the header end 154 to the tail end 155. Portions of the hollow interior space may be tapered or generally cylindrical or curved as desired or as determined for the particular application of the hydrocyclone apparatus 100.

Near the header end 154 of the tube 151 is a breech opening 152 in the peripheral wall thereof for inserting an inlet block 161 into the tube 151. The inlet block 161 is inserted into the tube 151 somewhat like a breech loaded cartridge for a rifle, hence the name "breech" opening. The breech opening 152 is essentially a rectangular cut through the curved peripheral wall of the tube 151 spanning almost the entire diameter at that portion of the tube 151. The inlet block 161 is configured to nest into the hollow interior of the tube 151 at the breech inlet 152 so that the outer surfaces of each are practically flush with each other presenting a generally smooth surface for the liner 150.

The inlet block 161 comprises a back wall 166 which extends transversely across the hollow interior of the tube 151, a curved top wall 163 which rests within the breech opening, and generally curved bottom and side walls 165 and 167, respectively, which nest within recesses in the peripheral wall of the tube 151. The top wall 163 includes an inlet in the form of a slot 162 which is oriented generally tangentially to the longitudinal axis of the tube 151 for swirling the fluid mixture as it enters the liner 150. The inlet slot 162 preferably has an involute shape and is sometimes called an involute inlet. The fluid mixture tends to be quite abrasive particularly at the inlet block 161 and accordingly, the inlet block 161 is made of high abrasion resistant material such as ceramics, metal alloys or certain plastics. One example of a suitable alloy is a cobalt-chromium alloy sold under the trademark Stellite. The front of the inlet block 161 is open to allow the swirling fluid to pass from the inlet block 161 toward the tail end 155 of the liner 150. The back wall 166 includes a generally axial port 169 to allow one of the liquid constituents to exit the tube 151 through the header end 154 thereof. The side walls 167 of the inlet block 161 have generally flat portions 167A which engage with flat portions of the interior of the peripheral wall of the tube 151 so the inlet block 161 cannot rotate within the tube 151.

The inlet block 161 further includes a tab 164 which extends from the bottom wall 165 thereof. The tab 164 is arranged to nest in a knock out opening 153 in the peripheral wall of the tube 151 which is generally opposite to the breech opening 152 therein. The tab 164 is sized and shaped to fit into the knock out opening 153 and provide an outer surface which is smooth with the outer surface of the tube 151. As is best illustrated in FIGS. 4 and 5, the tab 164 and knock out opening 153 are offset longitudinally from the center of the breech opening 152. This is so that when the tab 164 is nested down in the knock out opening 153, the inlet block 161 is in its proper orientation for operation. A person not fully familiar with the assembly of the hydrocyclone apparatus 100 might otherwise install the inlet block 161 so that the back wall 166 faces the tail end 155 of the tube 151 rather than the header end 154. In this backward orientation, the tab 164 would be misaligned with the knock out opening 153 and engage the recessed peripheral wall of the tube 151. The top wall 163 would therefore project outwardly from the breech opening 152 by the thickness of the tab 164. This should alert the person assembling the liner 150 that the inlet block 161 is not in its proper place. However, as will be explained below, this feature of the top wall 163 projecting out of the breech opening 152 when the inlet block 161 is oriented backwards will prevent the installation of the misassembled liner 150 into the vessel 110.

The tab 164 also serves as a knock out for maintenance personnel to use to push the inlet block 161 out of the tube 151. After extensive use, it is expected that the liner 150 would collect a lot of sediment and scale in the gaps and joints such that the inlet block 161 may be pretty well stuck in the interior of the tube 151. In the present invention, a simple hammer and punch could be used to knock the inlet block 161 out through the breech opening 152. Without the knock out opening 153, it is likely that a maintenance person would insert a screw driver into the generally tangential slot 162 and pry the inlet block 161 out of the tube 151 perhaps damaging or distorting the slot 162. The slot 162 is typically designed with certain precision such that any disfiguration thereof may cause reduced hydrocyclone performance and increased Wear of the inlet block 161.

The liner 150 further includes a overflow plug 171 which is connected to the header end 154 of the elongate tube 151. The overflow plug 171 includes a nose portion 172 for inserting into the open header end 154 and having screw threads 173 for engaging the screw threads 159 in the tube. The nose portion 172 includes a sealing ring 175 for engaging the back wall 166 of the inlet block 161 and sealing therewith. An axial overflow gallery 178 in the overflow plug 171 is in general alignment with the axial port 169 in the inlet block 161 to receive the overflow fluid which exits through the port 169. The axial overflow gallery 178 extends to the distal end 181 of the overflow plug 171 to discharge the overflow fluid into the overflow discharge chamber 145. A plurality of holes 182 extend transversely through the overflow plug 171 near the distal end 181 which provide further outlets for the overflow fluid to be discharged from the overflow gallery 178 into the overflow discharge chamber 145.

The overflow plug 171 further includes a hexagonal portion adjacent the distal end having wrench flats 183 as best seen in FIG. 7. The elongate tube 151 includes wrench flats 156 so that maintenance personnel may utilize the various wrench flats to tighten or unscrew the overflow plug 171 from the elongate tube 151.

The overflow plug 171 further includes a securing portion 190 by which the liner is secured in the vessel 110. The securing portion 190 comprises a shoulder portion 191 and extends to and includes the distal end 181 of the overflow plug 171. The shoulder portion 191 of the securing portion 190 has a diameter larger than the remainder of the liner 150 and each of the openings 137 and 138 in the dividing plates 121 and 122. Accordingly, the shoulder portion 191 abuts the dividing plate 121 at the opening 137 therein. The liners 150 are inserted and removed from the vessel 110 through the open end 125A with the end cap 125 removed. With the liners 150 fully inserted into the openings 137 and 138 such that the shoulder 191 is firmly abutted to the dividing plate 121, the distal end 181 of the overflow plug 171 is just slightly recessed from the open end 125A. Thus, when the end cap 125 is secured over the open end 125A, the distal ends 181 are in close proximity to the end cap 125. Accordingly, the securing portion 190 of the overflow plug 171 is held substantially in place between the dividing plate 121 and the end cap 125. Therefore, the liner 150 is secured in the vessel 110 by the openings 137, 138 and by the dividing plate 121 and the end cap 125.

Adjacent the shoulder portion 191 along the outer surface of the overflow plug 171 are a pair of o-rings 185 which are nested into radial grooves on the periphery of the overflow plug 171. The o-rings 185 seal the openings 137 in the first dividing plate 121 around each liner 150 so that the medial inlet chamber 141 is sealed from the first end overflow chamber 145 and that the only way that chambers 141 and 145 may communicate are through the liner 150. The liner 150 further includes similar radial grooves in the periphery thereof for a second pair of o-rings to seal around the liners 150 in the openings 138 in the second dividing plate 122. The second set of radial grooves are positioned nearer to the tail end 155 of the elongate tube 151 to be in alignment with the second dividing plate 122 when the shoulder portion 191 abuts the first dividing plate 121. The outer periphery of the liner 150 may preferably be built up or provided with a collar which include the radial grooves. Again, the only way for the chambers 141 and 143 to communicate is through the liners 150.

As should be clearly understood from the drawings, the liner 150 can be and should be assembled and disassembled outside of the vessel 110 without having to perform any assembly or disassembly work on the liners 150 inside the vessel 110. The liners 150 of the present invention are particularly designed to have as few parts as possible, to fit together easily, and to minimize the peripheral space needed in the vessel 110 for each liner 150. The assembly of the liners 150 comprises installing the o-rings 185 into the radial grooves by sliding the o-rings 185 over the nose portion 172 and along the overflow plug 171 until they drop into their respective grooves. The o-rings near the tail end 155 may be installed in a similar manner. The inlet block 161 is inserted into the tube 151 through the breech opening 152 so that the tab 164 nests down into the knock out opening 153. The overflow plug 171 is connected to the elongate tube 151 by inserting the nose portion 172 into the open header end 154 of the tube 151 and engaging the threads 173 with the internal threads 159. The overflow plug 171 is rotated to tighten the screw threads 159, 173 until the sealing ring 175 is firmly seated to the back wall 166 of the inlet block 161. As best seen in FIGS. 4 and 5, the back wall 166 of the inlet block 161 is recessed inwardly from the back edges of the top, back and side walls 163, 165, and 167. As such the top, back and side walls 163, 165, and 167 form an axial flange 168 for the nose portion 172 to nest therewith in when the sealing ring 175 is seated against the back wall 166. Accordingly, the inlet block 161 is not only held in place by the frictional force of the sealing ring 175, but also by mechanical engagement of the nose portion 172 with the axial flange 168. Once the screw connection for the overflow plug 171 is fully tightened the liner 150 is fully assembled and ready to be installed into the vessel 110.

Referring now to FIG. 3, the preassembled liner 150 may be installed into the vessel 110 in a very simple process. The end cap 125 is removed from the end of the vessel by removing the bolts 126. With the end of the vessel 110 now open, the liner or liners 150 may simply be inserted, tail end first, into one of the openings 137. Since the tail end 155 is smaller than the openings 137, it should be easily inserted into one of the openings 137 in the first dividing plate 121. As the liner 150 is moved farther into the vessel 110, the tail end 155 must be aligned with the opening 138 in the second dividing plate 122 which corresponds to the selected opening 138 in the first dividing plate 121. The openings 137 and 138 which correspond to one another are in general axial alignment. Finally, the shoulder portion 191 of the liner 150 abuts against the first dividing plate 121 while the o-rings become aligned with the dividing plates 121 and 122 so as to seal the respective openings 137 and 138 around the liners 150. It is expected that the o-rings may form a tight fit within the openings 137 and 138. Accordingly, it may be necessary to tap the distal end 181 of the overflow plug 171 with a rubber hammer to seat the o-ring seals and the shoulder portion 191 against the dividing plate 121. To remove a liner 150 from the vessel 110, the holes 182 near the distal end 181 of the overflow plug 171 may be used for a tool to attach to the liner 150. For example, a tool, such as a slide hammer, having a hook for attaching to the holes 182 and a handle or some mechanism by which a pulling force may be exerted on a liner 150. The tool may be helpful to maintenance personnel since it might require an initial forceful knock to overcome the tight fit of the seals and any sediment that may further resist the removal of the liner 150 from the vessel 110, so a secure grasp of the liner 150 may be necessary to remove the liner 150 from the vessel 110.

One aspect of installing and removing liners 150 from the vessel 110, as was noted above, if the tab 164 had not seated or nested in the knock opening 153, then the top wall 163 of the inlet block 161 would have projected out of the breech opening 152. As such, while installing the misassembled liner 150 into the vessel 110, the top wall 163 engages the dividing plate 121 and prevents the liner 150 from being further inserted into the openings 137 and 138. With the liner 150 stopped at the inlet block 161, the vessel 110 cannot be closed thereby preventing this type of misassembly of the apparatus 100.

Once the liners 150 are all placed into the vessel 110, the end cap 125 is replaced over the open end 125A and the bolts 126 are used to secure the vessel pressure tight. It should be noted here again that all of the openings 137 and 138 must be filled with a liner or other device to prevent the chambers 141, 143 and 145 from communicating except through the liners 150. By closing the end cap 125 over the open end of the vessel 110, the liners 150 are secured in the vessel 110 as discussed above. However, While the arrangement has secured the liners 150 from longitudinal movement in the vessel 110 by the dividing plate 121 and end cap 125, and secured the liners 150 from radial displacement by the openings 137 and 138, this mounting arrangement does not prevent the liners 150 from rotating within the openings 137 and 138.

Figure 8:
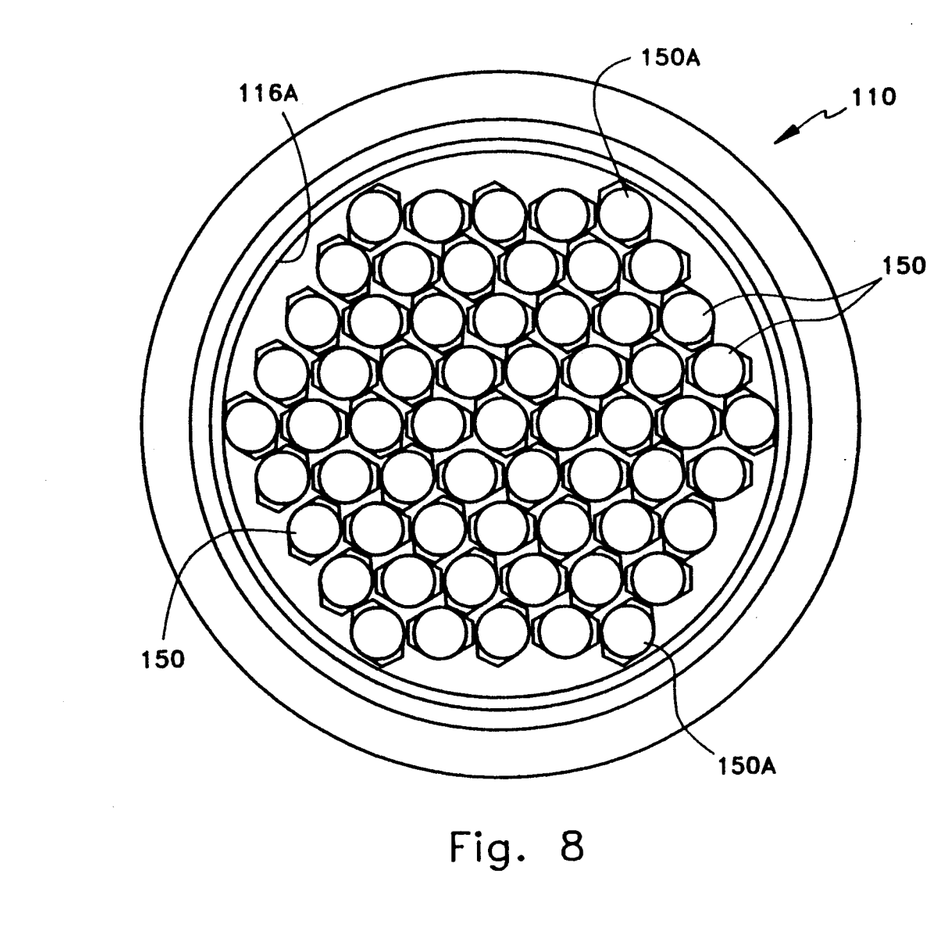
FIG. 8 is an end view of the vessel taken along the line 8—8 in FIG. 3 illustrating the density packing of the liners in the vessel.

The liners 150 have a tendency to rotate during operation of the hydrocyclone 100 because the drag of the fluid mixture entering the liner 150 through the generally tangential inlet slot 162. The rotation of the liners 150 may tend to accelerate wear of the o-rings 185, thus to limit the rotation, the shoulder 191 of the overflow plug 171 is shaped to limit or stop the rotation of the liners 150. It should be noted that preferably all of the liners are substantially identical and would be expected to rotate in the same direction. Referring now to FIGS. 7 and 8, the shoulder 191 comprises opposite lobes 192 and 193. The lobes 192 and 193 are sized and shaped to engage against the inside wall 116A of the vessel 110 or against the lobes 192 and 193 of adjacent liners 150 depending on where the liner is positioned in the vessel 110. As is best seen in FIG. 8, the liners 150 are arranged in a hexagon shape which provides the densest arrangement of the liners 150 in a cylindrical space. With the hexagon arrangement, there are six liners 150A positioned at the corners and are closest to the inside wall 116A. These corner liners 150A cannot freely rotate because the inside wall 116A interferes with the arcuate path of rotation of the lobes 192 and 193. Accordingly, the corner liners 150A will be limited from rotating by the inside wall 116A if there is not another element to block the path of the lobes 192 and 193 such as a lobe on an adjacent liner 150. With one of the lobes 192 and 193 stopped against the inside wall 116A, the other of the lobes 192 and 193 will extend outwardly blocking the arcuate path of rotation of the lobes of at least one liner 150 adjacent to the corner liner 150A. One of the lobes 192 and 193 of at least one of the adjacent liners 150 will then be stopped by the blocking lobe of the corner liner 150A. The adjacent liner 150 will then have its other lobe blocking the arcuate path of the lobes of liners 150 adjacent to the first mentioned adjacent liner 150. It should become clear that the lobes 192 and 193 of all the liners 150 in the vessel 110 eventually interlock with one another so that the liners 150 are limited from rotating in the openings 137 and 138.

The design of the shoulder portion 191 and the lobes 192 and 193 which comprise the shoulder portion 191 is an important feature of the present invention. The lobes 192 and 193 are sized, based upon a standard spacing between liners 150 in the vessel 110, such that the lobes 192 and 193 will pass adjacent liners 150 unless the adjacent liner 150 is oriented with one of the lobes 192 and 193 extending toward the passing lobe. The lobes 192 and 193 are further sized and shaped such that it avoids wedging with adjacent liners 150 or the lobes 192 and 193 of adjacent liners 150. The size and shape of the lobes 192 and 193 form a shoulder portion 191 having a square edged oval shape.

The term wedging is intended to describe the locking or fixing of two liners against one another so that significant force is required to free one from the other. One method of two liners wedging against one another in the environment of the present invention is where a first lobe on a liner contacts a lobe on an adjacent liner at a low angle of incidence and the adjacent liner is prevented from rotating in a direction that will allow the first lobe to continue rotating. The low angle of incidence is more particularly described as being where the first lobe may slide along the side of the second lobe after the contact but before sufficient resistance is experienced by the first lobe against the second lobe. Once the requisite resistance is met, the second lobe has been deflected somewhat and is then exerting a substantial restoration force, similar to the restoration force of a deflected spring, against the end of the first lobe. The restoration force causes significant frictional forces between the lobes so that neither tube may be easily rotated or pulled from the vessel. There may be other methods of adjacent liners becoming wedged by interaction of the lobes and the above method was presented only as an example. The design of the lobes 192 and 193 which avoids the problem of wedging was achieved after much consideration and experimentation and is best explained and understood in the context of the process of its development.

The design process began with the idea that the densest packing arrangement is the hexagon or honey comb arrangement. Therefore, it was originally proposed that the shoulder portions have a hexagon shape similar to the head of a bolt. A hexagon shaped shoulder portion essentially has six lobes extending outwardly in mutually opposite angles. As such, at least some of the six lobes on this proposal would extend outwardly from the corner liners 150A beyond the inside wall 116A requiring a slightly larger vessel 110 to accommodate the same number of liners 150. As noted above, the size, weight and capacity of hydrocyclones are important considerations and it was decided that two of the six lobes should be removed to minimize the size of the vessel for the desired capacity. The four remaining lobes essentially formed two opposite lobes with flat ends. It was this configuration that the wedging problem arose. To alleviate the wedging problem, the sides of each lobe 192 and 193 were tapered inwardly so that the lobes of the present invention are narrower than the flat portions of the original hexagon shape. With this stubby and narrow lobe design, one lobe of one liner will not be blocked by another lobe or wall such that the opposite lobe will be at a low angle to any other lobe. Moreover, when two adjacent lobes do contact one another, the contact is rather blunt having a high angle of incidence therebetween.

Once the lobes 192 and 193 have interlocked and limited further rotation, the force causing the rotation will serve to tighten the screw thread connection between the elongate tubes 151 and the overflow plugs 171. More particularly, the fluid mixture entering the generally tangential inlet slot 162 imposes a rotation force on the liner 150 as discussed above. With the force being imposed at the inlet slot 162 which is in the inlet block 161, the inlet block 161 must be secured from rotating. As discussed above, the inlet block 161 nests with the elongate tube 151 such that the inlet block 161 cannot rotate relative to the tube 151. However, the tube 151 is prevented from rotating by the interlocking of the lobes 192 and 193 on the overflow plug 171 and the tube 151 is connected by screw threads to the overflow plug 171. Accordingly, depending on the orientation of the screw threads to the rotation force, the screw thread connection will be urged to tighten or loosen during operation of the hydrocyclone apparatus 100. In the present invention, the screw thread connection is oriented relative to the generally tangential inlet 162 such that the screw thread connection tightens during operation of the hydrocyclone apparatus 100.

Turning now to the operation of the hydrocyclone apparatus 100, the process begins with a high pressure fluid mixture being injected through the inlet port 131 into the medial inlet chamber 141 wherein the rate of entry of the fluid mixture may be regulated by a suitable valve (not shown). As the medial inlet chamber 141 fills with the high pressure fluid mixture, the mixture enters the liners 150 through the generally tangential inlet slots 162 in the inlet blocks 161. The generally tangential orientation of the slots 162 causes the fluid mixture to swirl at a very high rate which tends to force the denser liquid constituent to the outside of the liner 150 and the lighter density liquid constituent to the inside thereof. The swirling fluid mixture moves toward the open tail end 155 as the inside diameter of the liner 150 gets smaller. Eventually, the heavier liquid constituent exits the tail end 155 of the liner 150 into the underflow discharge chamber 143 and the lighter density liquid constituents are pushed to the center or axis of the liner 150. The axial port 169 permits the lighter density fluid to pass into the axial overflow gallery 178 and from there into the overflow discharge chamber 145 and out through the overflow port 133. The heavier liquid constituent in the underflow discharge chamber 143 is conducted out through the discharge port 132 which may be controlled by a valve (not shown) so as to control the pressure drop from the inlet port 131 to the outlet port 132. In the case of oil separation from water on an offshore oil platform, the heavier liquid constituent is oil-free water and is delivered overboard. The overflow may be combined with the production stream of the other oil produced from the well.

By adjusting the valves (not shown) at each of the ports 131, 132 and 133, the pressures in the various chambers 141, 143 and 145 may be controlled so that the inlet chamber 141 is at a pressure above the pressures of the discharge chambers 143 and 145. More particularly, the inlet chamber 141 is typically operated at a substantially higher pressure than the discharge chambers 143 and 145. The discharge chambers are not necessarily operated at the same pressure wherein one may be higher than the other. Adjusting the relative pressures of the chambers may alter the ratio of overflow to the underflow. It should be noted that in a de-oiler such as the illustrated embodiment, the substantial majority of the fluid mixture is expected to be discharged through the tail end 155. In a dewatering hydrocyclone, the amount of overflow would be higher and as noted above, the overflow discharge chamber may be larger to handle the additional volume of overflow fluid. To accommodate such additional capacity the third section 116 of the vessel 110 may have additional length compared to the illustrated third section 116 and include a perforated plate therein which would be arranged to be proximate to the distal ends 181 of the overflow plugs 171. The perforated plate serves to secure the liners 150 in the vessel 110 as the end cap 125 does in the illustrated embodiment while permitting the overflow fluid to pass therethrough. The larger capacity overflow discharge chamber may also be provided with a larger discharge port 133. The dewatering hydrocyclone may further include different geometries, for example, the liners 150 may have a different relative size of the open tail end 155 to the size of the axial port 169. The geometries are more fully discussed in U.S. Pat. Nos. 4,237,006 to Colman et al. and 4,749490 to Smyth et al.

One particular design feature related to the different pressures in the chambers is the dimension as noted above of the dividing plate 121. In particular, the first dividing plate 121 is provided with a small thickness dimension relative to the end cap 125. Since the shoulder portions 191 of the overflow plugs 171 abut the dividing plate 121 and the distal ends 181 of the overflow plugs 171 are in close proximity to the end cap 125, the dividing plate 121 is limited from deflecting toward the end cap 125. Moreover, as noted above, the pressure in the medial inlet chamber 141 is significantly higher than the pressure in the overflow discharge chamber 145 and, accordingly, the dividing plate 121 would only deflect in the direction of the end cap 125. As such, the dividing plate 121 may be made with the thinner dimension anticipating that support will come in the form of the securing portions 190 of the overflow plugs 171 bridging the gap to the high strength end cap 125. The end cap 125, by standard design must withstand all the pressure that the vessel 110 can accommodate so that the end cap 125 can clearly carry the extra load. This design strategy allows for some reduction in the weight of the hydrocyclone apparatus 100.

The foregoing description of the preferred embodiment is intended to disclose and explain the invention in clear and unambiguous terms. However, it in no way should be interpreted that the invention is limited to the preferred embodiment described herein as there are many variations and modifications that could be made which embrace the spirit of the invention. Accordingly, the scope of the invention should be determined solely from the claims that follow.

We claim:

1. A hydrocyclone apparatus for separating a fluid mixture into at least two constituent parts by density, said apparatus comprising:
   an elongate tube having a peripheral wall enclosing a hollow interior, a first header end, an opposite open tail end for discharging the heavier density liquid, and a breech opening in said peripheral wall; and
   an inlet block generally radially received into said hollow interior of said elongate tube through said breech opening;
   a generally tangentially oriented inlet opening through said inlet block within said breech opening and defined predominantly by said inlet block for admitting the fluid mixture into said hollow interior of said elongate tube with a swirling motion.

2. The hydrocyclone apparatus according to claim 1 further comprising means for securing said inlet block in said hollow interior.

3. The hydrocyclone apparatus according to claim 2 wherein said means for securing said inlet block is oriented longitudinally with respect to said elongate tube and engages a portion of said inlet block to secure said inlet block from exiting said hollow interior through said breech opening.

4. The hydrocyclone apparatus according to claim 1 further comprising a reject plug attached to said header end of said elongate tube wherein said reject plug includes a distal end portion having a plurality of radial holes arranged so that a tool can be inserted through at least one of said holes to firmly grasp said elongate tube and support the same.

5. A hydrocyclone apparatus for separating a fluid mixture into at least two constituent parts by density, said apparatus comprising:
   an elongate tube having a peripheral wall enclosing a hollow interior, a first header end, an opposite open tail end for discharging the heavier density liquid, and a breech opening in said peripheral wall; and
   an inlet block received into said hollow interior through said breech opening and having a generally tangentially oriented inlet for swirling the fluid mixture as it is admitted into said hollow interior of said elongate tube, wherein said inlet block comprises a generally closed back wall, generally closed bottom and side walls, a top wall having said generally tangentially oriented inlet extending therethrough and an open front such that in operation, said back wall extends transversely across said hollow space and faces toward said header end, said open front faces toward said tail end, and said top wall coincides with said breech opening and said side and bottom walls are adjacent said peripheral wall of said elongate tube, and wherein said generally closed back wall includes a small generally axial port for the lighter density fluid to pass to said header end.

6. The hydrocyclone apparatus according to claim 5 wherein said header end is open and said apparatus further comprises a reject plug for connecting to said header end of said elongate tube and including an axial reject gallery for collecting and discharging the lighter density fluid from said small generally axial port in said inlet block.

7. The hydrocyclone apparatus according to claim 6 wherein said reject plug includes a nose portion for being inserted into the open header end of said elongate tube and wherein said inlet block includes a portion opposed to said nose portion for nesting therewith to secure said inlet block in said hollow interior.

8. The hydrocyclone apparatus according to claim 7 wherein said reject plug is secured to said tube by screw threads, and wherein said screw threads are oriented relative to said generally tangential inlet such that the drag of the fluid mixture passing through said tangential inlet causes said elongate tube to rotate in a direction which tightens said screw threads between said elongate tube and said reject plug.

9. The hydrocyclone apparatus according to claim 6 wherein said elongate tube includes a knock out opening in said peripheral wall generally opposite to said breech opening wherein said knock out opening is generally smaller than said breech opening, and wherein said inlet block includes a tab on said generally closed bottom wall having a size and shape complementary to said knock out opening for being received therein when said inlet block is positioned in its operation position within said hollow interior such that the inlet block may be pushed or knocked out its operating position and out of said hollow interior by pushing on said tab.

10. The hydrocyclone apparatus according to claim 9 wherein said tab and knock out opening are shaped and positioned relative to said breech opening that said tab will not nest within said knock out opening unless said inlet block is in its proper orientation for operation.

11. The hydrocyclone apparatus according to claim 9 wherein said tab is flush with said peripheral wall at said knock out opening.

12. The hydrocyclone apparatus according to claim 6 wherein each of said elongate tube and said reject plug includes wrench flats for use in disconnecting said reject plug from said elongate tube.

13. A hydrocyclone apparatus for separating a fluid mixture into at least two constituent parts by density, said apparatus comprising:
   an elongate tube having a peripheral wall enclosing a hollow interior, a first header end, an opposite open tail end for discharging the heavier density liquid, and a breech opening in said peripheral wall; and
   an inlet block for being received into said hollow interior through said breech opening and having a generally tangentially oriented inlet for swirling the fluid mixture as it is admitted into said hollow interior of said elongate tube, wherein said inlet block has an operating position in said hollow interior of said tube at which said inlet block is desirably maintained for operation of the hydrocyclone apparatus, and wherein said inlet block has an outer surface oriented to face generally radially outward from said breech opening when said inlet block is in its operating position, and wherein said peripheral wall of said elongate liner has an outer surface, and wherein said inlet block outer surface is generally flush with said peripheral wall outer surface at said breech opening when said inlet block is in its operating position in said hollow interior of said tube.

14. A hydrocyclone apparatus for separating a fluid mixture into at least two constituent parts by density, said apparatus comprising:
- a relatively elongate tube having a peripheral wall enclosing a hollow interior, a first header end, an opposite open tail end for discharging the heavier density liquid, a breech opening in said peripheral wall, and a knock out opening in said peripheral wall generally opposite to said breech opening;
- an inlet block received into said hollow interior through said breech opening and having a generally tangentially oriented inlet for swirling the fluid mixture as it is admitted into said hollow interior of said elongate tube, said inlet block including a tab having a size and shape complementary to said knock out opening for being received therein when said inlet block is positioned in its operating position in said hollow interior such that the inlet block may be pushed or knocked out of said hollow interior through said breech opening by pushing on said tab.

15. The hydrocyclone apparatus according to claim 14 wherein said tab and knock out opening are shaped and positioned relative to said breech opening such that said tab will not nest within said knock out opening if said inlet block is not properly oriented within said hollow interior.

16. The hydrocyclone apparatus according to claim 14 wherein said tab is generally flush with said peripheral wall at said knock out opening when said inlet block is in its proper operating position.

17. A hydrocyclone apparatus for separating a fluid mixture into at least two constituent parts by density, said apparatus comprising:
- a relatively elongate tube having a peripheral wall enclosing a hollow interior, a first open header end, an opposite open tail end for discharging the heavier density liquid, and a breech opening in said peripheral wall;
- an inlet block generally radially received into said hollow interior of said elongate tube through said breech opening;
- a generally tangentially oriented inlet opening through said inlet block within said breech opening and defined predominantly by said inlet block for admitting the fluid mixture into said hollow interior of said elongate tube in a swirling motion; and
- a reject plug for being received into said header end of said elongate tube to engage said inlet block and restrain said inlet block from exiting said hollow interior through said breech opening.

18. The hydrocyclone apparatus according to claim 17 wherein said reject plug is secured in said open header end by screw threads.

19. A hydrocyclone apparatus for separating a fluid mixture into at least two constituent parts by density, said apparatus comprising:
- a relatively elongate tube having a peripheral wall enclosing a hollow interior, a first open header end, an opposite open tail end for discharging the heavier density liquid, and a breech opening in said peripheral wall;
- an inlet block for being generally radially received into said hollow interior of said elongate tube through said breech opening;
- a generally tangentially oriented inlet opening within said breech opening and defined predominantly by said inlet block for admitting the fluid mixture into said hollow interior of said elongate tube in a swirling motion; and
- a reject plug received into said header end of said elongate tube to engage said inlet block and restrain said inlet block from exiting said hollow interior through said breech opening wherein said reject plug is secured by screw threads in said open header end, and wherein said screw threads are oriented relative to said generally tangentially oriented inlet of said inlet block so that the drag of the fluid mixture passing through said tangential inlet causes said elongate tube to rotate in a direction which tightens said screw threads between said elongate tube and said reject plug.

* * * * *